United States Patent
Wang

(10) Patent No.: US 11,750,296 B2
(45) Date of Patent: *Sep. 5, 2023

(54) OPTICAL COMMUNICATION LINK RANGING

(71) Applicant: Lockheed Martin Corporation, Bethesda, MD (US)

(72) Inventor: Li Leah Wang, Fremont, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,079

(22) Filed: Jan. 28, 2022

(65) Prior Publication Data

US 2022/0166514 A1 May 26, 2022

Related U.S. Application Data

(63) Continuation of application No. 16/953,634, filed on Nov. 20, 2020, now Pat. No. 11,258,515.

(51) Int. Cl.
*H04B 10/50* (2013.01)
*H04B 10/516* (2013.01)

(52) U.S. Cl.
CPC ......... *H04B 10/503* (2013.01); *H04B 10/516* (2013.01)

(58) Field of Classification Search
CPC .. H04B 10/502; H04B 10/503; H04B 10/516; H04B 10/25752
See application file for complete search history.

(56) References Cited

U.S. PATENT DOCUMENTS

| | | | |
|---|---|---|---|
| 11,258,515 B1* | 2/2022 | Wang | H04B 10/503 |
| 2005/0135811 A1 | 6/2005 | Lee et al. | |
| 2005/0242994 A1 | 11/2005 | Cobb et al. | |
| 2014/0270783 A1* | 9/2014 | Prather | H04B 10/25752 398/115 |
| 2016/0033649 A1* | 2/2016 | Mathews | G01S 19/246 342/357.48 |
| 2020/0280829 A1* | 9/2020 | Benefield | H04W 4/46 |

OTHER PUBLICATIONS

McGarry, Jan, "An Overview of Satellite Laser Ranging (SLR)," NASA/GSFC/694, 37 pages, Jun. 2012.
Nasa, "Near Laser Rangefinder," https://pds.nasa.gov/ds-view/pds/viewInstrumentProfile.jsp?INSTRUMENT_ID=NLR&INSTRUMENT_HOST_ID=NEAR, 6 pages, Jul. 2020.
ThalesAlenia Space, "TDRSS Compatible S-Band Transponder," 2 pages, Apr. 2011.

* cited by examiner

*Primary Examiner* — Dzung D Tran

(57) ABSTRACT

Provided herein are various improvements to laser communication ranging. In one example, a method includes combining a ranging signal with data communications into an optical transmission for receipt by a communication node, and obtaining an additional optical transmission transferred by the communication node comprising additional data communications combined with a retransmitted version of the ranging signal. The method includes determining an indication of a range to the communication node based at least on a comparison between properties of the ranging signal and properties of the retransmitted version of the ranging signal after separation from the additional data communications.

20 Claims, 6 Drawing Sheets

OPTICAL COMMUNICATION LINK RANGING

RELATED APPLICATIONS

This application is a continuation of, and claims priority to, U.S. patent application Ser. No. 16/953,634, entitled "LASER COMMUNICATION LINK RANGING AND TIMING," and filed Nov. 20, 2020.

TECHNICAL BACKGROUND

Precise ranging and timing measurements are employed on communication links requiring positioning, navigation, and timing (PNT) capabilities. While several techniques have been developed for ranging in radio frequency (RF) domains, such as in mobile wireless networks and satellite communications, optical or laser communications (lasercom) lack a standardized ranging technique. Some laser communication ranging techniques employ two different sets of equipment that incorporates RF transceivers for ranging signaling in addition to optical transceivers for the communication signaling. Another common lasercom ranging technique is based on a precision time counter technique. In this technique, a dedicated high power short-pulse laser is required, which is separate from any lasers used for communication transmissions. The short-pulse laser triggers a precision time counter for time-of-flight comparisons with a returned echo pulse, reflected by optics from the other side of the link. The time duration measured is the round-trip time over the link, and the range is based on the speed of the light and round-trip time. The timing/ranging resolution of this technique depends on on-board clock accuracy, number/strength of the pulse echoes, pulse duration, and time-counter resolution. This technique has several limitations. One limitation is that a separate short pulsed laser source (sub-nanosecond) is required, which can be expensive and bulky, comprising a whole separate set of dedicated optical components for ranging. In addition, this technique suffers low return turn-out of the echo pulses due to optical alignment discrepancies between the pulse laser beam and the main laser beam carrying communications. If few echo pulses are successfully returned, the ranging resolution can suffer. Yet another limitation is that gated detection is employed to trigger a time counter, which requires expensive ultra-fast photodetectors or single-photon detection devices.

OVERVIEW

Provided herein are various improvements to laser communications and techniques for determining a range or distance between two laser communication (lasercom) nodes. The examples herein combine ranging signaling and data communications into a common optical transmission, using a higher frequency optical sideband for the ranging signaling than for the data communications. This optical transmission carries data communications from a first node to a second node concurrent with ranging signaling. The ranging portion of the optical transmission comprises a pseudorandom noise (PN) code. The second node performs a loopback operation on the ranging signal received from the first node, while combining the loopback version of the ranging signal with additional data communications in a return optical transmission. The first node correlates PN codes embedded in the two versions of the ranging signal (original and loopback) to determine a range between the two communication nodes which can then be used to alter optical transmission parameters for further laser communications.

In one example, a method includes combining a ranging signal with data communications into an optical transmission for receipt by a communication node, and obtaining an additional optical transmission transferred by the communication node comprising additional data communications combined with a retransmitted version of the ranging signal. The method includes determining an indication of a range to the communication node based at least on a comparison between properties of the ranging signal and properties of the retransmitted version of the ranging signal after separation from the additional data communications.

In another example implementation, an apparatus includes a transmitter configured to establish an optical transmission comprising data communications combined with a ranging signal. A signal processing system is configured to obtain an additional optical transmission transferred by a communication node and comprising additional data communications combined with a retransmitted version of the ranging signal. The signal processing system is configured to determine an indication of a range to the communication node based at least on a comparison between properties of the ranging signal and properties of the retransmitted version of the ranging signal after separation from the additional data communications.

In yet another example implementation, a system includes a communication node configured to establish a first optical transmission comprising first data communications combined with a ranging signal. The communication node is configured to receive a second optical transmission transferred by a distant communication node and comprising second data communications combined with a retransmitted version of the ranging signal. The communication node configured to separate the retransmitted version of the ranging signal from the second data communications, and determine a range to the distant communication node based at least on a comparison between properties of the ranging signal and properties of the retransmitted version of the ranging signal.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
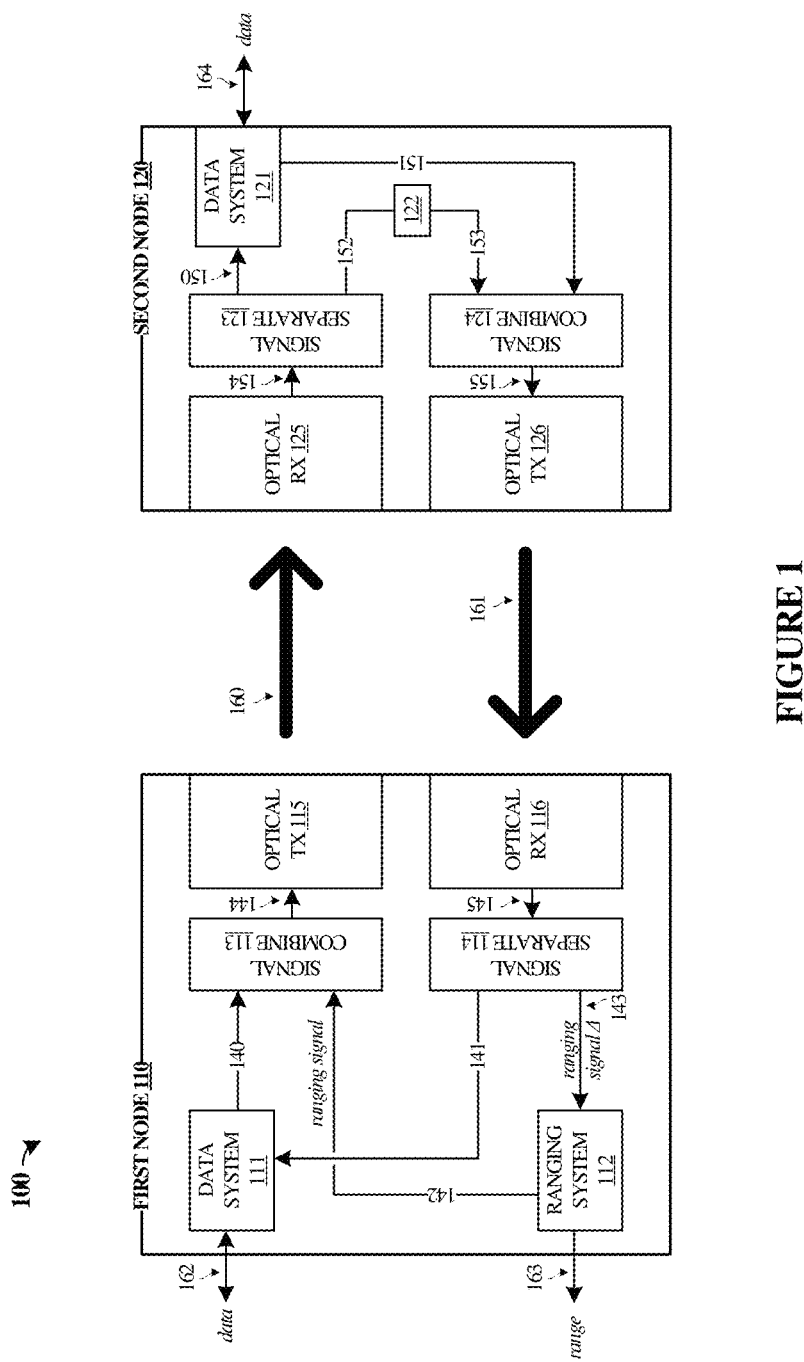
FIG. 1 illustrates a laser communication system in an implementation.

Laser communication (lasercom) links employ optical transmissions instead of radio frequency (RF) transmissions, such as microwave transmissions. Lasercom technologies are becoming more popular for use in satellite communications, especially for satellite-to-satellite communications due to correspondingly high bandwidth in point-to-point applications. However, lasercom systems perform best when distances or ranges between communication nodes, such as satellites, are determined with high accuracy. Results from ranging and timing processes indicate positioning, navigation, or tracking of the various communication nodes, such as among endpoints attempting to initiate a communication session. Few ranging and timing techniques have been developed so far for lasercom, and those that do exist lack reliable ranging or require extra equipment in addition to that used for the actual data communications between nodes. One common lasercom ranging technique is to have a separate laser transmitter configured to reflect off a distant communication node to gauge the range to the communication node. However, such configurations not only require an additional high-speed laser and associated optics on both ends of the communication link, but also require precision time counter or clocking technologies to determine time-of-flight or speed of light characteristics. Moreover, since separate lasers are employed, one for ranging and one for communications, the optical path alignment between the separate lasers can vary and cause issues with speed or resolution of the ranging systems.

Other lasercom ranging techniques can employ radio frequency (RF) transmissions for determining a range which is then separate from any data communications over optical transmissions. These RF ranging transmissions can also be employed in purely RF communications, such as in terrestrial wireless data communications. However, using RF transmissions for ranging requires RF spectrum allocation, which also competes with other RF communications bandwidth. One ranging technique for RF communications is based on a pseudorandom binary sequence (PRBS), pseudonoise (PN) code, or pseudorandom noise (PRN) code correlation, referred to herein as a PN code. PN codes are modulated onto a ranging tone to be sent over an RF link and the turn-around return signal is demodulated from another RF link to recover the PN codes for timing correlation with the original to extract the round-trip time. Range is determined by multiplying the timing measurement by the speed of the light. The accuracy of this RF timing/ranging method depends in part on the signal-to-noise ratio of the turn-around ranging signal, the range clock frequency, and PN code characteristics. Depending on the resolution and acquisition requirements, PN code ranging can be implemented in various configurations, regenerative, transparent, coherent, non-coherent, one or multi-ranging tones, and one or more types of PN codes.

The enhanced implementations discussed herein employ PN code ranging techniques in lasercom systems. Rather than transmitting in an RF domain directly, RF ranging tones are modulated by an origin node onto a laser carrier as one or more subcarriers and transmitted as an optical signal along with any data communications. At the other side of the optical link, the RF ranging tone is stripped off the optical transmission and put on a return laser carrier along with any return data communications as a turn-around ranging tone. The turn-around retransmission or echo is then recovered by a receiver at the origin node terminal and a PN ranging processor can be used to process the PN code correlation between the sent tone and the turn-around tone. Advantageously, no RF spectrum allocation is required for precision ranging capability on lasercom systems. Additionally, the same laser carrying digital data communications can be used to carry ranging tones, so no dedicated ranging lasers are needed. In the examples herein, a ranging tone is included within an optical transmission such that the same optical transmission carrying data communications is used for ranging purposes. Ranging tone frequencies are typically established as greater than the highest data communications data rate to reduce potential interference. Also, the use of these higher frequency ranging tones enables higher frequency PN codes for higher timing resolution. Ranging ambiguity and resolution depends in part on the signal-to-noise ratio and highest frequency of the PN range tone.

In a first example implementation, FIG. 1 is presented. FIG. 1 is a system diagram illustrating laser communication system 100. Laser communication system 100 includes two communication nodes, namely first node 110 and second node 120. Other nodes can be included in laser communication system 100, but are omitted for clarity in FIG. 1. Node 110 and node 120 communicate over optical communication links, shown as example links 160-161 in FIG. 1. Link 160 is employed as an optical communication link from first node 110 to second node 120, while link 161 is employed as an optical communication link from second node 120 to first node 110. The communication medium in FIG. 1 is typically air or space, and thus the optical communication links can be referred to as laser communication links, or lasercom links. However, similar techniques can be employed if another medium is employed, such as fiber optic cable, optical waveguides, or other optical media. Typically, first node 110 and second node 120 will have a range or distance between themselves, which can vary if the nodes are moving or mobile.

First node 110 comprises data system 111, ranging system 112, signal combination module 113, signal separation module 114, optical transmitter 115, and optical receiver 116. Second node 120 comprises data system 121, loopback element 122, signal separation module 123, signal combination module 124, optical receiver 125, and optical transmitter 126. Further systems and elements can be included in first node 110 and second node 112, such as optics, aiming systems, computing systems, or logistical systems comprising propulsion and navigation systems. First node 110 and second node 120 might comprise satellite devices, spaceborne vehicles, airborne vehicles, terrestrial communication nodes, water-based nodes, or other nodes which communicate over one or more lasercom links.

In operation, first node 110 and second node 120 can relay communications among each other, for use in transferring digital data, telemetry, or other various communication traffic. First node 110 and second node 120 can be included in a larger system of several communication nodes, and each of the nodes can have similar functionality. Moreover, first node 110 and second node 120 can be further coupled to other communication systems, data systems, routers, servers, or other devices over links 162, 163, and 164. FIG. 1 focuses on operations from the perspective of first node 110, and thus a different set of components is shown for first node 110 and second node 120. However, first node 110 and second node 120 can both include similar elements.

To provide for efficient transfer of optical energy among communication nodes, a ranging process is employed. This ranging process can determine distances between nodes as well as geometric/angular relationships in space. Results from the ranging process can be employed to tune or adjust optical transmissions for better receipt of the optical transmissions by target nodes.

Figure 2:
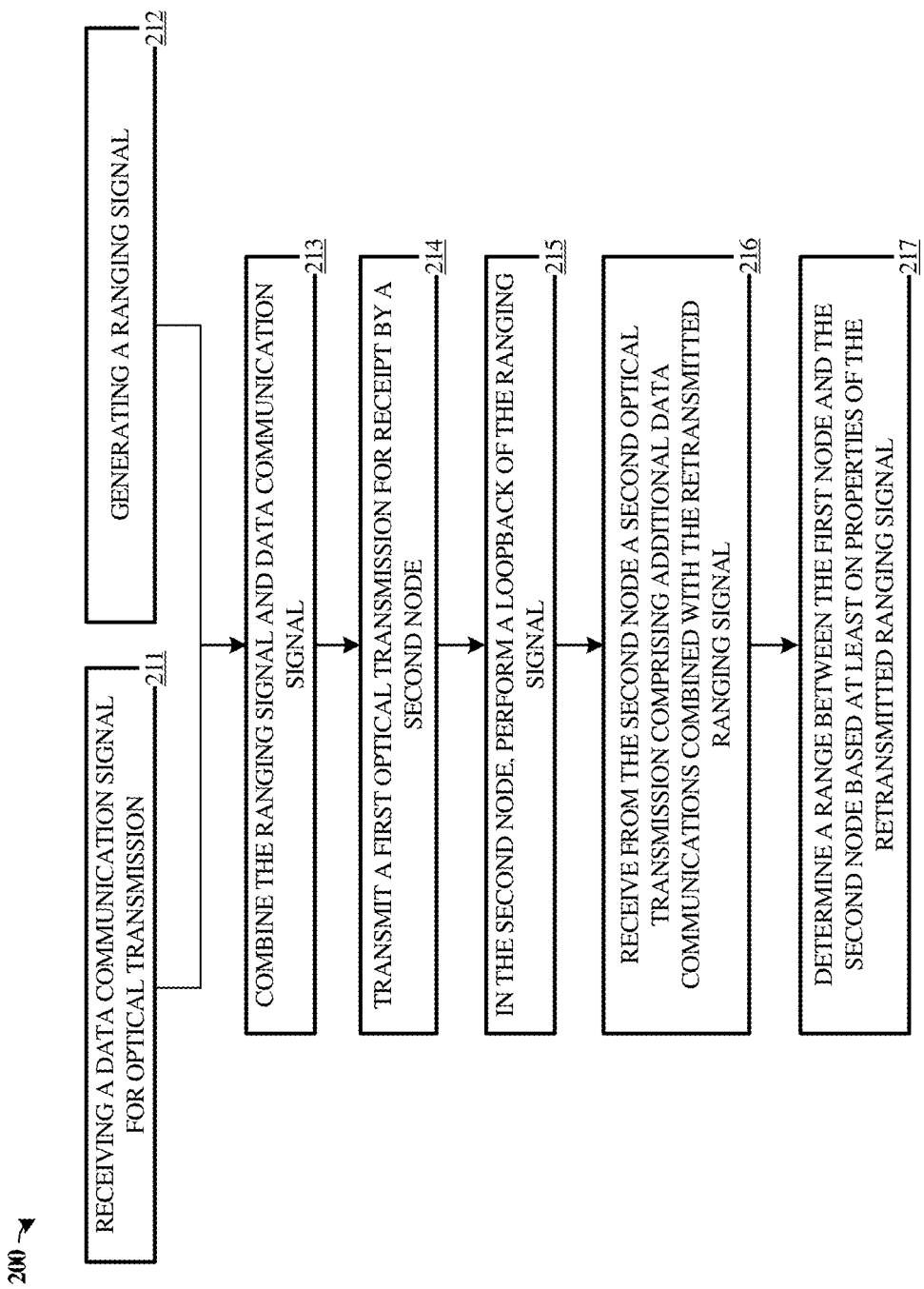
FIG. 2 illustrates example operations for a laser communication system in an implementation.

FIG. 2 illustrates one example method 200 of performing a ranging process. In FIG. 2, data system 111 receives data communications over link 162, which might comprise digital communications, data packets, frames, and the like, carried by link 162. In some examples, data system 111 might receive data communications from another communication node. Data system 111 then generates a data communication signal (operation 211) for transfer over link 140. This data communication signal can comprise an RF signal which has a corresponding bandwidth and carrier frequency or frequencies. Concurrently, a ranging signal is generated by ranging system 112 in first node 110 (operation 212) for transfer over link 142. This ranging signal can comprise a ranging code and is modulated with an RF carrier having a corresponding frequency. These two RF signals (data communication signal and ranging signal) are combined in signal combination module 113 to form an intermediary RF signal over link 144 (operation 214). Optical transmitter 115 comprises an optical modulator and associated laser(s) elements, which converts the intermediary RF signal into an optical transmission for transfer over link 160 (operation 214).

Various signal handling techniques can be employed to combine and optically modulate the data communication signal and ranging signal. In one example, the data communication signal and ranging signal are both generated as RF signals which are then combined in the RF format into a combined RF signal. This combined RF signal is then converted into an optical signal for optical transmission to a distant node. In another example, the data communication signal and ranging signal are both generated as RF signals which are then converted into separate optical signals. These separate optical signals are combined in the optical format into a combined optical signal for optical transmission to a distant node. The example shown in FIG. 1 can be employed for either configuration discussed above. Specifically, signal combination module 113 might combine signals in an RF format into a combined RF signal, or might instead first convert the RF signals into an optical format before combination of the optical signals into a combined optical signal. Optical transmitter 115 can either receive RF signals or optical signals, and transmit these signals in an optical format as an optical transmission over link 160.

Once the optical transmission received in second node 120 over link 160, optical receiver 125 can convert the optical transmission into an electrical format, such as an RF format. In other examples, optical receiver 125 might instead keep the optical transmission in an optical format for use by signal separation module 123. Regardless of the optical or RF format, optical receiver 125 transfers the signals of the optical transmission over link 154 for separation into at least two signals by signal separation module 123. Signal separation module 123 then transfers a first signal corresponding to the data communication signal over link 150 to data system 121, and transfers a second signal corresponding to the ranging signal over link 152. As with the transmission side of system 100, various signal handling techniques can be employed in either the RF format or optical format. For example, optical receiver 125 can provide a combined signal in the RF format or optical format to signal separation module 123. When optical receiver 125 provides the combined signal in the RF format, then optical receiver 125 converts the optical signal received over link 160 into an RF format, and signal separation module 123 separates the signals in the RF format into two or more signals. When optical receiver 125 provides the combined signal in the optical format to signal separation module 123, then signal separation module 123 converts the combined signal in the optical format to the combined signal in the RF format, or instead first separates the signal in the optical format before converting the separate signals from the optical format into the RF format.

Second node 120 performs a loopback (operation 215) or echo of the ranging signal. The ranging signal is separated from incoming data transmissions by signal separation module 123, and transferred to loopback element 122 over link 152 for retransmission to first node 110. In some examples, signal separation module 123 provides the ranging signal in the RF format to loopback element 122. In other examples, signal separation module 123 provides the ranging signal in the optical format to loopback element 122. When RF signaling is employed, loopback element 122 might comprise one or more signal handling elements, such as buffers, signal regenerators, amplifiers, or other signal processing elements. When optical signaling is employed, loopback element can comprise optics, optical elements, waveguides, fiber optic elements, optical amplifiers, and the like. Loopback element 122 may be omitted in some examples. However, when employed, loopback element 122 does not alter the signal content or the ranging codes carried by the ranging signal in the RF format or optical format.

Also, in second node 120, data system 121 can receive the data communication signal from signal separation module 123 in the RF format or optical format and convert into one or more digital communication interfaces, data interfaces, packet interfaces, and the like, for transfer over link 164. In addition to data received over (lasercom) link 160, data system 121 can provide additional data communications received over link 164 for transmission by second node 120 over (lasercom) link 161 to first node 110. These additional data communications can be provided over link 151 to signal combination module 124. These additional data communication signal can comprise an RF format or optical format which has a corresponding bandwidth and carrier frequency or frequencies. Signal combination module 124 combines the data signal comprising the additional data communication with a looped or echoed version of the ranging signal. Signal combination module 124 might combine signals in an RF format into a combined RF signal, or might instead first convert the RF signals into an optical format before combination of the optical signals into a combined optical signal. Optical transmitter 126 can either receive RF signals or optical signals, and transmit these signals in an optical format as an optical transmission over link 161. The optical transmission over link 161 comprises data communications and the retransmitted version of the ranging signal.

First node 110 then receives (operation 216) from second node 120 an optical transmission over link 161 comprising additional data communications combined with the retransmitted ranging signal. Optical receiver 116 can receive this optical transmission and convert the optical transmission into an electrical format, such as an RF format. Other examples include where optical receiver 116 keeps the optical transmission in an optical format for use by signal separation module 114. Regardless of optical or RF format provided by optical receiver 116 over link 145, signal separation module 114 separates the data communications from the retransmitted ranging signal. Signal separation module 114 provides the retransmitted ranging signal over link 143 to ranging system 112, and provides the additional data communications over link 141 to data system 111. Data system 111 can then further transfer the additional data communications over a corresponding data interface mentioned above.

First node 110 determines (operation 217) a range between the first node and the second node based at least on properties of the retransmitted ranging signal. Ranging system 112 can compare properties of the ranging signal transferred initially over link 142 with the retransmitted ranging signal received over link 143. In many examples, the ranging signal comprises a ranging code which is compared within ranging system to determine an indication of the range. For example, to determine the indication of the range, ranging system 112 can perform a code correlation process between a pseudorandom noise (PN) code comprising the ranging signal and a PN code comprising the retransmitted version of the ranging signal. The PN code of the ranging signal comprises the PN code of the ranging signal before transmission by first node 110. The PN code of the retransmitted version of the ranging signal comprises the PN code of the ranging signal after retransmission by second node 120 and transit over links 160-161. From this comparison or code correlation process, an indication of the range between first node 110 and second node 120 can be determined. The indication of the range can indicate a distance between the nodes, as well as angular relationships between the nodes. From this information, ranging system 112 can transfer an indication of the range over link 163, provide to optical transmitter 115 or optical receiver 116 for adjustment of optic elements or aiming elements, as well as other operations. Furthermore, an indication of the range might be transferred to second node 120. In other examples, second node 120 performs a similar ranging sequence with first node 110, where first node 111 retransmits a ranging signal initiated by second node 120.

Returning to a discussion on the elements of FIG. 1, first node 110 and second node 120 each comprise communication nodes, which may be incorporated into other systems or devices. First node 110 and second node 120 may comprise terrestrial, orbital, airborne, spaceborne, marine, or other nodes which may be incorporated into an accompanying vehicle, such as an aircraft, satellite, probe, car, truck, boat, balloon, or other mobile or stationary device.

Data systems 111 and 121 can comprise various interfacing elements, which interwork among one or more data interfaces, communication/interface standards, and RF or optical links. Data interfaces are illustrated by links 162 and 164. RF links or optical links are illustrated by links 140 and 150. Data systems 111 and 121 can comprise RF modulation circuitry, data bus interfacing circuitry, transceivers, amplifiers, parallel-to-serial or serial-to-parallel conversion circuitry, data buffers, analog-to-digital (ADC) or digital-to-analog (DAC) circuitry, control circuitry, and other various circuitry. In examples where data systems 111 and 121 transfer signaling in an optical format over links 140 and 150, then optical modulation circuitry can be included, such as lasers, laser diodes, electrical-to-optical circuitry, and associated optics.

Data systems 111 and 121, as well as ranging system 112 can each comprises can each include communication interfaces, network interfaces, processing systems, computer systems, microprocessors, storage systems, storage media, distributed computing systems, or some other processing devices or software systems, and can be distributed among multiple devices or across multiple locations. Examples of data systems 111, 121, and ranging system 112 can each include software such as an operating system, logs, databases, utilities, drivers, networking software, and other software stored on a computer-readable medium. Data systems 111, 121, and ranging system 112 can each comprise one or more platforms which are hosted by a distributed computing system or cloud-computing service. Data systems 111, 121, and ranging system 112 can each comprise logical interface elements, such as software defined interfaces and Application Programming Interfaces (APIs). Data systems 111, 121, and ranging system 112 can each include one or more user interfaces, such as graphical user interfaces, web interfaces, APIs, terminal interfaces, console interfaces, command-line shell interfaces, extensible markup language (XML) interfaces, among others. In addition to the aforementioned elements, ranging system 112 can include further circuitry to determine ranging among communication nodes. This further circuitry can include PN code generation circuitry, PN code correlation circuitry, ranging code comparison circuitry, pseudo-random noise code generation circuitry, and other associated circuitry.

Links 162-164 can comprise one or more data communication links, such as one or more data links comprising wireless or wired links. Links 162-164 can comprise various logical, physical, or application programming interfaces. Example links can use metal, glass, optical, air, space, or some other material as the transport media. Links 162-164 can use various data protocols and formats, such as Peripheral Component Interconnect Express (PCIe), Ethernet, InfiniBand, Internet Protocol (IP), FibreChannel, Thunderbolt, wireless Ethernet or Wi-Fi (802.11x), cellular wireless technologies, hybrid fiber-coax (HFC), Bluetooth, other wired or wireless data interfaces, or some other communication format, including combinations, improvements, or variations thereof. Links 162-164 can include direct links or may include intermediate networks, systems, or devices, and can include a logical network link transported over multiple physical links. Links 162-164 can include routers, switches, bridges, traffic handling nodes, and the like for transporting traffic among endpoints.

Links 140-145 and links 150-155 can each comprise electrical links carrying modulated radio frequency (RF) communications, or selected ones may comprise optical links carrying modulated optical communications. Links 140 and 150 carry signaling that has a particular set of signal parameters that may include center frequency, carrier frequencies, bandwidth, power settings, channels, channel sets, frequency sets, or frequency spread, among others. While implementations of links 140 and 150 are not limited to a particular frequency range, some implementations may utilize a frequency range corresponding to the Institute of Electrical and Electronics Engineers (IEEE) bands of S band, L band, C band, X band, Ku band, Ka band, V band, W band, among others, including combinations thereof. Other example RF frequency ranges and service types include ultra-high frequency (UHF), super high frequency (SHF), extremely high frequency (EHF), or other parameters defined by different organizations. When optical communications are employed, these communications typically include optically-relevant carrier frequencies and modulations according to various optical communication standards.

Optical transceivers 115 and 125 each comprise various optical transmission circuitry and components. In examples where optical transceivers 115 and 125 receive signals over links 114 and 155 in an RF format, optical transceivers 115 and 125 include lasers, optics, and modulation circuitry to convert the electrical signaling into modulated optical signaling. Typically, a laser will be employed to create a carrier wavelengths or frequencies and signals will be modulated onto that carrier. Example carrier frequencies include 191 terahertz (THz), among other frequencies. Various optics can be employed to focus or direct the optical signal out of first node 110 and towards second node 120. Aiming or steering mechanisms, such as gimbals, deformable mirrors/lenses, or micro-electromechanical elements can be employed.

Optical receivers 116 and 126 various optical sensing circuitry and components. In examples where optical receivers 116 and 126 receive signals in an optical format and output signals in an electrical or RF format, optical receivers 116 and 126 comprise optical-to-electrical conversion circuitry. This circuitry can include photodiodes, avalanche photodiodes (APDs), photomultiplier elements, along with various optics or mirrors to direct incident light onto the associated sensing element. In examples where optical receivers 116 and 126 output optical signals, then the incident optical signals can be converted into a different optical format or transferred from a free-space medium to a different medium, such as fiber optic or other waveguide.

Signal combination modules 113 and 123 combine two or more signals into a unified signal or intermediary signal. In examples where signal combination modules 113 and 123 have RF signals as inputs, signal combination modules 113 and 123 can combine input signals in the RF format into an intermediary RF signal, and then output the intermediary RF signal. RF signal combination elements include multiplexers or signal couplers, and the like. In examples where signal combination modules 113 and 123 have optical signals as inputs, signal combination modules 113 and 123 can combine input signals in the optical format into an intermediary optical signal. Optical couplers or optical multiplexers can be employed in such examples. Various equalization or dynamic range adjustments might be made to input signals to balance into an intermediary signal (RF or optical). One or more guard bands can be included, such as a guard band of 10%. In some examples, frequency shifting may be employed to combine signals into a single intermediary signal and provide for adequate guard bands and reduction in interference or crosstalk between signal portions. In the techniques herein, the data communication signals will typically have signal bandwidths and carrier frequencies below that of the ranging signal. Thus, when combined, the intermediary signal will have a first portion corresponding to a data communication bandwidth and a second portion corresponding to a ranging signal bandwidth, with the ranging signal higher in frequency than the data communication signals.

Signal separation modules 114 and 124 separate a source/input signal into two or more discrete or individual signals. Signal separation modules 114 and 124 can comprise RF or optical demultiplexers, signal filters, bandpass filters, high-pass filters, low-pass filters, comb filters, notch filters, and other filter types. Filtering can occur in the frequency domain, or may instead occur in the time domain, phase domain, or other transform domains. Various equalization or dynamic range adjustments might be made to input signals to balance into separated signals (RF or optical).

Figure 3:
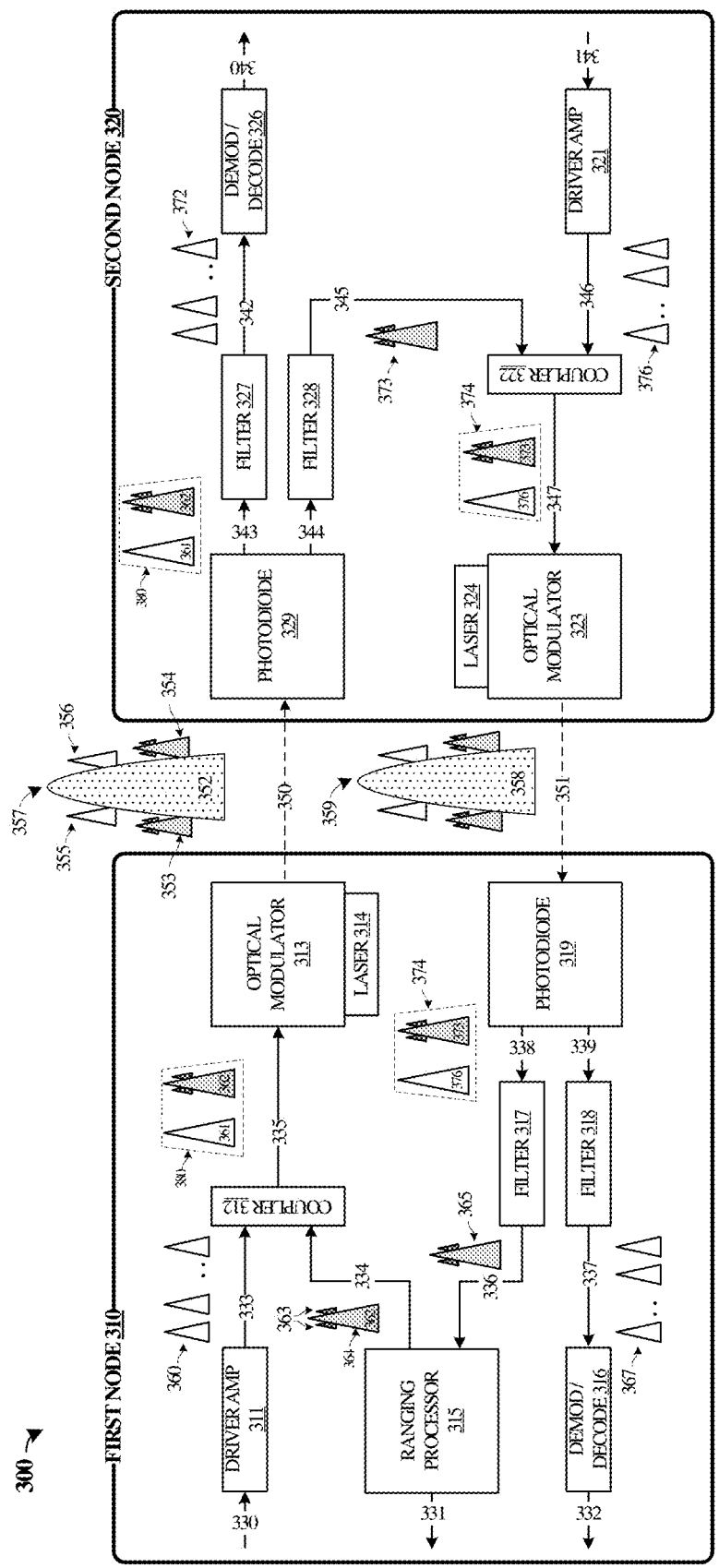
FIG. 3 illustrates a laser communication system in an implementation.

FIG. 3 includes system 300. System 300 illustrates a schematic view of communication nodes that perform an enhanced ranging process. Various signal representations in the frequency domain are included in FIG. 3 to illustrate signal properties, sideband elements, and signal separation/combination processes. These representations have a vertical property relating to the energy or amplitude of the signal, and a horizontal property relating to the frequency or frequency range of the signal. The representations are not shown to scale, and instead are shown at varying sizes to graphically fit nearby associated links. Nodes 310 and 320 can include similar elements, components, and configurations as discussed above for nodes 110 and 120 in FIG. 1, although variations are possible. First node 310 communicates with second node 320 over one or more optical links. These optical links can propagate through the air or space and originate with optical energy produced by one or more lasers. Thus, the node-to-node communications can be referred to as 'lasercom' herein.

First node 310 comprises driver amplifier 311, signal coupler 312, optical modulator 313, laser 314, ranging processor 315, decoder/demodulator 316, filters 317-318, and photodiode 319. Second node 320 comprises driver amplifier 321, coupler 322, optical modulator 323, laser 324, decoder/demodulator 326, filters 327-328, and photodiode 329. Other components and elements are omitted from FIG. 3 for clarity, such as optics, beam aiming/pointing elements, vehicle logistics elements, external data systems, and other components.

In FIG. 3, first node 310 receives data communications over link 330 for transfer to second node 320. These data communications can comprise user data, network communications, packet traffic, or any various types of data. Driver amplifier 311 receives data communications over link 330 and converts the data communications from a digital data format into a modulated RF format, which might comprise one or more carriers, as shown for RF signal 360 transferred over link 333. Coupler 312 receives a data signal comprising the data communications in the RF format and combines this data signal with a ranging signal received over link 334. This combination produces intermediary signal 380 over link 335 which is shown having two main components, a data portion 361 and a ranging portion 362 which has a higher carrier frequency that the data portion. More than one data portion can be included, and all data portions together can have a composite bandwidth. However, the ranging signal comprises a carrier frequency and bandwidth which places the ranging portion above any bandwidth of the data portion. Optical modulator 313 modulates a laser beam created by laser 314 to establish an optical signal comprising the data portions and ranging portion. Optical modulator 313 establishes optical signal 357 which has optical carrier 352, sideband signals 353-354 for the ranging signal, and sideband signals 355-356 for the data signals. This optical signal 357 propagates in free space over optical link 350 for detection by second node 320.

Once optical signal 357 reaches second node 320, photodiode 329 detects optical signal 357 and converts the optical format into an RF or electrical format as well as removes optical carrier 352. Photodiode 329 produces local version of intermediary signal 380, of which copies are provided over links 343 and 344 to filters 327-328. Filter 327 filters out a high-frequency portion of intermediary signal 380 corresponding to ranging signal 362 to produce data signal 372 over link 342. Filter 328 filters out a low-frequency portion of intermediary signal 380 corresponding to data signal 361 to produce ranging signal 373 over link 345. Filters 327-328 can include various signal filtering elements or techniques, such as low-pass, high-pass, bandpass, or other similar signal filters. Typically, ranging signal 362 will have an associated carrier frequency higher than the highest data rate of data signal 361 to avoid or reduce interference between the two portions. Advantageously, this allows for the use of higher frequency ranging tones than typically employed, corresponding to higher frequency PN codes for higher timing resolution than conventional systems.

Demodulator/decode module 326 receives data signal 372 over link 342 and demodulates or decodes data signal 372 to produce digital communications suitable for a corresponding digital data interface represented by link 340. The digital communications can be transferred to various data systems for consumption, processing, or relaying of the associated data.

Coupler 322 receives ranging signal 373 over link 345 and may receive additional data communications in an RF or electrical format over link 346 from driver amplifier 321. Link 345 provides for turn-around of ranging signal 373, referred to as an echo or retransmission. Link 345 can be transparent with regard to the signal, or might include one or more regenerative or re-driver elements to boost ranging signal 373 before retransmission. Driver amplifier 321 receives digital data for transfer to first node 310 over link 341 and converts this digital data into RF modulated data signal 376 for transfer to coupler 322 over link 346. Data signal 376 can comprise one or more carriers, each with a corresponding portion of the data communications. Coupler 322 combines data signal 376 and ranging signal 373 into intermediary signal 374 comprising the data portions and ranging portion for transfer over link 347 to optical modulator 323. Optical modulator 323 modulates a laser beam created by laser 324 to establish an optical signal comprising the data portions and ranging portion of intermediary signal 347. Optical modulator 323 establishes optical signal 359 which has optical carrier 358 along with corresponding sideband signals for the ranging signal and sideband signals for the data signals. This optical signal 359 propagates in free space over optical link 351 for detection by second node 310.

Once optical signal 359 reaches first node 310, photodiode 319 detects optical signal 359 and converts the optical format into an RF or electrical format as well as removes optical carrier 358. Photodiode 319 produces local version of intermediary signal 374, of which copies are provided over links 338 and 339 to filters 317-318. Filter 318 filters out a high-frequency portion of intermediary signal 374 corresponding to ranging signal 373 to produce data signal 367 over link 337. Filter 317 filters out a low-frequency portion of intermediary signal 374 corresponding to data signal 376 to produce ranging signal 365 over link 336. Filters 317-318 can include various signal filtering elements or techniques discussed above for filters 327-328. Demodulator/decode module 316 receives data signal 367 over link 337 and demodulates or decodes data signal 367 to produce digital communications suitable for a corresponding digital data interface represented by link 332. The digital communications can be transferred to various data systems for consumption, processing, or relaying of the associated data, and may comprise similar systems which provide data over link 330.

Ranging processor 315 receives ranging signal 365 over link 336. Ranging signal 365 comprises a retransmitted (or echoed) version of ranging signal 362 originally produced by ranging processor 315. Ranging processor 315 processes content of each of ranging signal 362 and ranging signal 365 to determine an indication of the range between first node 310 and second node 320. This processing can take the form of a code correlation process between the PN code comprising the original ranging signal and the PN code comprising the retransmitted version of the ranging signal that determines a delay or time shift between the original ranging signal and the retransmitted version of the ranging signal. From this delay or time shift, as well as an indication on the speed of propagation of the optical signal (typically the speed of light, depending upon the transmission medium), the range can be determined. Since first node 310 is both transferring and receiving the ranging code by way of second node 320, the time shift will correspond to double the range, and thus a factor of two can be removed from the ranging result of the code correlation process. Moreover, the retransmission of the ranging signal by second node 320 might have associated delays through photodiode 329, filter 328, coupler 322, and optical modulator 323, as well as associated links. These delays of second node 320 can be characterized and subtracted from the time shift noted above to produce a more accurate range. However, in some cases, the delays within second node 320 might be small enough compared to the distance of propagation of the optical signals that the delays within second node 320 can be ignored. Ranging processor 315 outputs an indication of the range over link 331. This indication of the range can be transferred in any suitable format for use by additional systems for altering optical transmission properties, orientation, angles, intensity, or other properties of optical emissions of first node 310 over link 350. Furthermore, this indication of the range might be provided within data communications portions of data signal 361 for receipt and usage by second node 320 to similar optical transmission properties associated with optical link 351.

Turning to a discussion on the generation of a ranging signal, ranging processor 315 can generate a pseudorandom noise (PN) code which is modulated onto a ranging tone comprising a carrier frequency. In FIG. 3, ranging signal 362 comprises two sidebands 363 which comprise the PN code, and together this forms the ranging signal when modulated onto ranging tone 364. The PN code, also referred to as a pseudorandom noise (PRN) code, might comprise T4B or T2B code types, among others. The T4B code refers to the weighted-voting (v=4) balanced Tausworthe code, and the T2B code refers to the weighted-voting (v=2) balanced Tausworthe code. Various properties of the T4B or T2B codes can dictate on whether one code type or the other is selected, such as acquisition time, jitter requirements, signal-to-noise ratios (SNRs), ranging accuracy requirements, and other considerations. Ranging processor 315 can comprise code generators, shift registers, code generation loops, integrators, arithmetic units, logic elements, processors, filters, memory elements, phase delay elements, voltage-controlled oscillators, numerically-controlled oscillators, random number generation elements, and other various elements.

Figure 4:
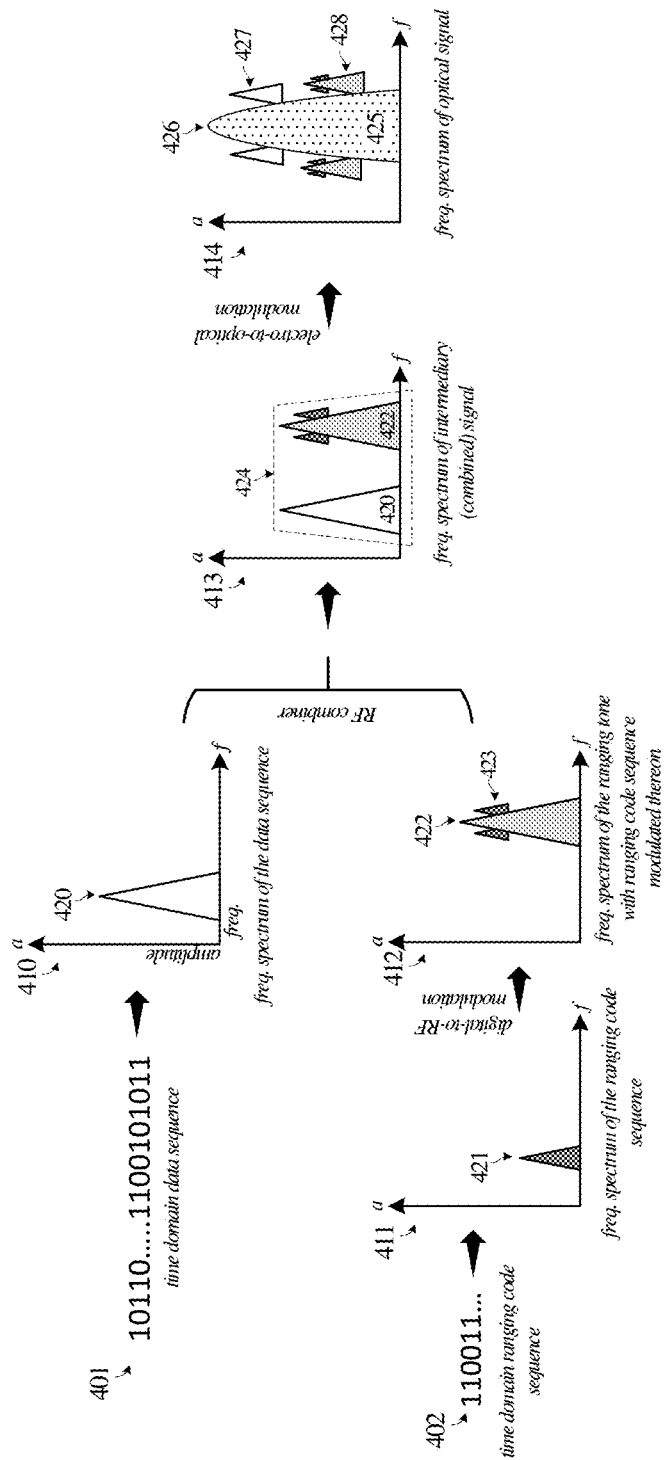
FIG. 4 illustrates example signal properties for a laser communication system in an implementation.

FIG. 4 is presented to further illustrate spectrum characteristics of data signals and ranging signals employed in the examples herein. Several graphs are presented in FIG. 4, each representing a frequency domain illustration of various signals. Each of the signals has a corresponding amplitude and frequency bandwidth. The signals are not shown to scale in FIG. 4. Instead, the signals are merely illustrative of example signals and associated combinations/transforms as employed in the ranging techniques discussed herein.

In FIG. 4, time domain data sequence 401 comprises data communications to be transferred by a communication node. This time domain data sequence comprises binary data which is then converted into an RF signal indicated by data signal 420 having a carrier frequency and amplitude as seen in graph 410. In addition to the data communications, time domain ranging code sequence 402 is generated by a ranging circuit or ranging processor. This time domain ranging code sequence 402 can comprise a PN code or similar ranging code. Time domain ranging code sequence 402 is converted into code signal 421 as seen in graph 411. Then, code signal 421 is modulated with an RF carrier frequency to create ranging tone 422. Graph 412 illustrates ranging tone 422 with two symmetrical sideband portions 423 representing code signal 421. Next, graph 413 illustrates data signal 420 and ranging tone 422, as combined in an RF combiner process, to create intermediary signal 424 which comprises data signal 420 and ranging tone 422. Finally, an optical signal is established based on intermediary signal 424. In graph 414, a modulated laser output is employed to establish optical carrier 425 which has elements of intermediary signal 424 modulated thereon to create optical signal 426. This optical signal 426 is then emitted by a communication node forming a lasercom link. The sidebands of optical signal 426 are symmetrical due in part to the frequency beating being symmetric. Thus, optical signal 426 comprises optical carrier 425 with various subcarriers—two related to the ranging signal and two related to the data signal. More subcarriers can be employed when more elaborate data signals or ranging signals are employed.

Advantageously, the configurations discussed in FIG. 4 and in the other examples herein provide for enhanced ranging between lasercom communication nodes, and can be employed in Tracking and Data Relay Satellite System (TDRSS) environments. For example, the same laser signal can be employed to carry both communication data and ranging signaling. No separate laser signal is needed for ranging, which eliminates extra equipment, circuitry, and optics. The ranging tone is 'hidden' within the optical carrier such that the same optical channel carrying communication data is used for ranging purposes. Specifically, an RF ranging signal carrying PN codes is modulated onto an optical carrier as a sub-carrier along with communication data. In the sub-carrier form, little to no interference between communication data and ranging codes occurs, as the ranging tone has a carrier higher than the bandwidth of the signal carrying the communication data. Thus, an RF ranging signal is carried inside the same lasercom signal used for communication data. As with other ranging techniques, the ranging ambiguity and resolution depends on range signal-to-noise ratios, and the highest frequency of the PN range tone. Because of the higher ranging tone than typically employed, due in part to the capability of an optical signal, ranging ambiguity is reduced and ranging resolution is increased as compared to conventional techniques.

Figure 5:
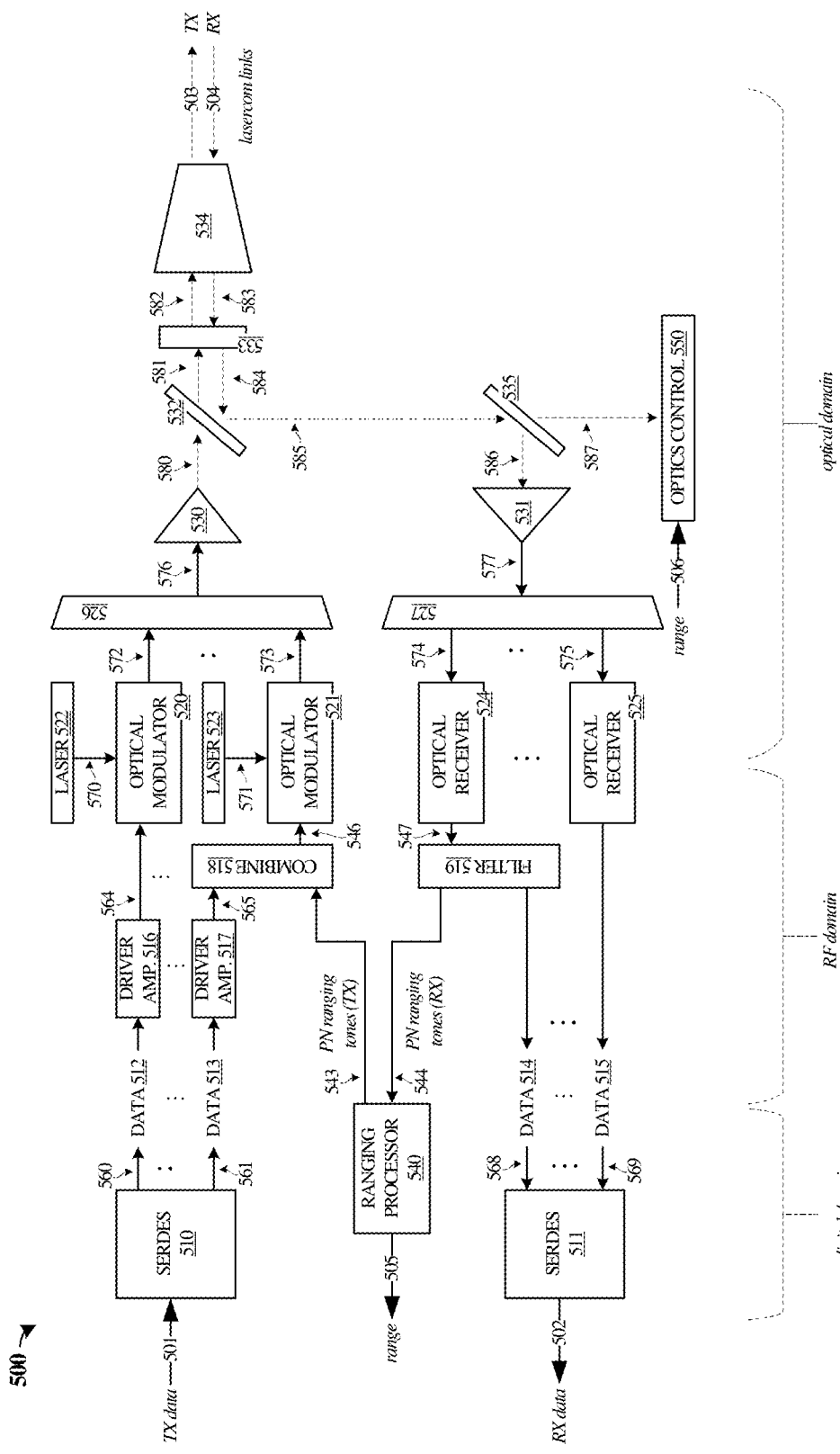
FIG. 5 illustrates a laser communication system in an implementation.

FIG. 5 illustrates a specific implementation example for an optical communication node, represented by system 500. System 500 can be an example of any of the communication nodes discussed herein, such as nodes 110 and 120 of FIG. 1, as well as nodes 310 and 320 of FIG. 3. In FIG. 5, communications data received by the optical communication node over data link 501 is transmitted over lasercom link 503, and communications data received by the optical communication node over lasercom link 504 is transferred over data link 502. The lasercom links are established with one or more distant or remote optical communication nodes, not shown in FIG. 5 for clarity. In order to establish lasercom links and ensure that signal-to-noise ratios of the lasercom links are above threshold levels for effective communications, a ranging process among communication nodes is conducted. This ranging process, as described herein, includes outbound ranging communications along with outbound data communications in a combined transmit (TX) lasercom link (503). Also, inbound ranging communications along with inbound data communications are carried by a combined receive (RX) lasercom link (504). Additional links of either variety might be included to further enhance operation or provide for greater communication throughput.

System 500 includes serial/deserializers (serdes) 510-511, driver amplifiers 516-517, signal combiner 518, signal filter 519, optical modulators 520-521, lasers 522-523, optical receivers 524-525, wave-division multiplexed (WDM) multiplexer 526, WDM de-multiplexer 527, optical amplifiers 530-531, optics 532-536, ranging processor 540, and optics controller 550. The elements of system 500 can be grouped into three main domains, a digital domain where data is represented in a digital format, an RF domain wherein signals are represented in an RF format, and an optical domain where signals are represented in an optical format.

In operation, serial transmit data (TX) is received over data link 501 by serdes 510 which deserializes the data into a plurality of parallel data lanes represented by data 512-513 on data links 560-561. Driver amplifiers 516-517 convert data 512-513 into an RF format for transfer over RF links 564-565. Since the data was parallelized into a plurality of parallel data lanes, each data lane is individually modulated into an RF format having a corresponding carrier frequency. First ones of the RF formatted data lanes are driven over corresponding links to optical modulators, such as shown for link 564 and optical modulator 502. At least one of the RF formatted data lines is driven first to signal combiner 518 for combination with another signal, namely a transmit (TX) copy of PN ranging tones generated by ranging processor 540 onto link 543. PN ranging tones can comprise various PN code types (e.g. T4B or T2B code types) and have a corresponding carrier frequency. When combined by signal combiner 518 with at least one of the data lanes from driver amplifier 517, form an intermediary RF signal. This intermediary RF signal is presented over link 546 to optical modulator 521.

Optical modulators 520-521 modulate a laser source (522, 523) to produce optical signals. The RF formatted data lines are used to modulate onto a carrier wavelength, sourced from the lasers, to form multiple corresponding optical data lanes. In this example, multiple wavelengths are employed, one for each of the optical data lanes—with one of the optical data lines combined with the PN ranging tone. These multiple optical WDM, multiple wavelengths/colors are transferred over links 572-573 for multiplexing by WDM multiplexer 526 into an outbound WDM optical transmission on link 576. From herein, the outbound WDM optical transmission comprises many wavelengths and is presented to amplifier 530 to achieve a desired amplitude before emission by telescope optic 534 as lasercom link 503. This outbound WDM optical transmission first propagates through optic 532 comprising a dichroic filter or mirror and through optic 533 comprising adaptive optics (AO), as well as associated optical links 580-852.

Once received by a distant communication node, a ranging portion of the WDM optical transmission is stripped from a data communication portion of the WDM optical transmission for loopback by way of another WDM optical transmission carried by lasercom link 504. Lasercom link 504 is received by telescope optic 534 and directed through AO 533 before being reflected by dichroic filter 532 to beam splitter 535. Dichroic filter 532 passes light of certain wavelengths but reflects others. In this example, properties of dichroic filter 523 are selected to pass the outbound WDM optical transmission but reflect the inbound WDM optical transmission from the distant communication node. Different sets of wavelengths can be employed for the outbound and inbound WDM optical transmissions. Use of dichroic filter 532 allows for redirection of the inbound WDM optical transmission to receiver elements as well as monitoring/control elements. After passing through AO 533, redirection by dichroic filter 532, reflection by beam splitter 535 (over links 583-586), the inbound WDM optical transmission is directed to optical amplifier 531. Optical amplifier 531 is employed to achieve a desired amplitude, such as to normalize levels of the inbound WDM optical transmission to compensate for a loss in amplitude after propagation from the distant communication node or loss in amplitude from beam splitter 535. WDM de-multiplexer 527 separates the inbound WDM optical transmission into a plurality of optical signals each comprising a separate wavelength or carrier onto links 574-575. Optical receivers 524-525 convert the optical signals into signals in an RF format for transfer over RF links 547 and 569. A first of the signals is passed through filter 519 which separates a data communication portion from a ranging signal portion. The data communication portion comprises data 514 and is presented over link 568. The ranging portion comprises a received (RX) version of the PN ranging tone and is presented over link 544. Data 514-515 can be converted from a parallel format into a serialized format by serdes 511 for transfer over data link 502.

Ranging processor 540 receives PN codes comprising the RX version of the PN ranging tone and performs a comparison with the PN codes comprising the TX version of the PN ranging tone to determine an indication of the range between communication nodes associated with lasercom links 503 and 504. This comparison can take the form of a code correlation process between the PN codes comprising the TX version and the PN codes comprising the RX version that determines a delay or time shift between the two PN codes. From this delay or time shift, as well as an indication on the speed of propagation of the optical signal (typically the speed of light, depending upon the transmission medium), the range can be determined. Since system 500 is both transferring and receiving the PN codes by way of a distant node, the time shift will correspond to double the range, and thus a factor of two can be removed from the ranging result of the code correlation process. Moreover, the retransmission of the PN codes by the distant node might have component-based retransmission delays. These delays can be characterized and subtracted from the time shift noted above to produce a more accurate range.

Ranging processor 540 outputs an indication of the range over link 505. This indication of the range can be transferred in any suitable format for use by additional systems for altering optical transmission properties, orientation, angles, intensity, or other properties of optical emissions of system 500. One example use of the range determined by ranging processor 540 is to adjust elements of the optical domain of system 500. Specifically, the range can be provided over link 506 to optics controller 550 which adjusts characteristics of optics in system 500 to alter beam angles, beam intensities, or other beam properties associated with emission of lasercom link 503. For example, adaptive optics (AO) 533 or orientation/angle of telescope element 534 can be altered based on the range to provide a better signal-to-noise characteristic for emission of lasercom link 503 with respect to the receiver or distant node. Optics controller 550 can measure current properties of inbound lasercom link 504 to determine if adjustments need to be made to optics when transmitting outbound lasercom link 503, with the range determined by ranging processor 540 also being a factor. Thus, more effective communications can be established between communication nodes using a ranging beacon or ranging tone that is embedded into optical transmissions between nodes. When similar ranging equipment is employed in the distant node, then both inbound and outbound lasercom links can be enhanced using local range calculations.

Figure 6:
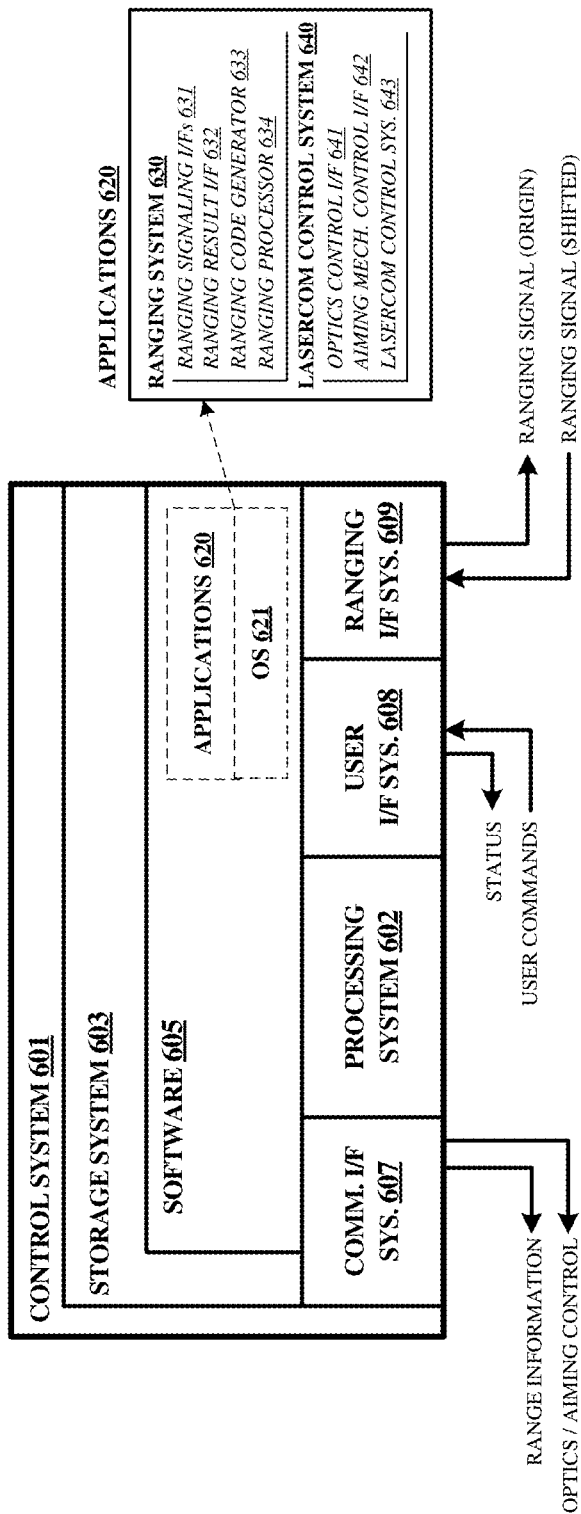
FIG. 6 illustrates a communication control system and software in an implementation.

FIG. 6 illustrates control system 600 and associated software 605 in an implementation. FIG. 6 illustrates control system 601 that is representative of any system or collection of systems in which the various operational architectures, scenarios, and processes disclosed herein may be implemented. For example, control system 601 can be used to implement elements of nodes 110 and 120 of FIG. 1, or nodes 310 and 320 of FIG. 3. Control system 601 might implement or control portions of data system 111, ranging system 112, signal combination module 113, signal separation module 114, loopback element 122, signal separation module 123, signal combination module 124, or data system 121 of FIG. 1. Control system 601 might implement or control portions of ranging processor 315, coupler 312, filters 317-318, demodulator/decoder 316, coupler 322, demodulator/decoder 326, or filters 327-328 of FIG. 3. Control system 601 might implement or control portions of ranging processor 540 or optics controller 550 of FIG. 5. Control system 601 might implement controllers for any of the circuitry, elements, modules, systems, apparatuses, and the like discussed herein.

Control system 601 may be implemented as a single apparatus, system, or device or may be implemented in a distributed manner as multiple apparatuses, systems, or devices. Control system 601 includes, but is not limited to, processing system 602, storage system 603, software 605, communication interface system 607, user interface system 608, and ranging interface system 609. Processing system 602 is operatively coupled with storage system 603, communication interface system 607, user interface system 608, and ranging interface system 609.

Processing system 602 loads and executes software 605 from storage system 603. Software 605 includes applications 620 comprising ranging system 630 and lasercom control system 640, which is representative of the processes, services, controls, and platforms discussed with respect to the included Figures. When executed by processing system 602 to provide ranging and control of lasercom nodes, among other services, software 605 directs processing system 602 to operate as described herein for at least the various processes, operational scenarios, and sequences discussed in the foregoing implementations. Control system 601 may optionally include additional devices, features, or functionality not discussed for purposes of brevity.

Referring still to FIG. 6, processing system 602 may comprise a microprocessor and processing circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data.

Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions comprising applications 620 and operating system 621 that provide ranging and control of lasercom nodes, among other services. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software or other application software, in addition to or that include ranging system 630 and lasercom control system 640. Software 605 may also comprise firmware or some other form of machine-readable processing instructions executable by processing system 602.

Software 605, when loaded into processing system 602 and executed, may transform a suitable apparatus, system, or device (of which control system 601 is representative) overall from a general-purpose computing system into a special-purpose computing system customized to provide ranging and control of lasercom nodes, among other services. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors. For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 620 can include ranging system 630 and lasercom control system 640. Ranging system 630 includes ranging signaling interface 631, ranging result interface 632, ranging code generator 633, and ranging processor 634. Lasercom control system 640 includes optics control interface 641, aiming mechanism control interface 642, and lasercom control system 643.

Ranging signaling interface 631 provides origin ranging codes, such as time domain ranging code sequences comprising binary representations of pseudorandom noise (PN) codes or other similar codes generated by ranging code generator 633. The origin ranging codes can be transferred by a communication node within an optical signal for retransmission by a distant communication node. Ranging signaling interface 631 also receives time domain ranging code sequences sent by distant nodes, which comprises time shifted or delayed versions of the origin ranging codes, often referred to as a loopback, echo, or turnaround version of the ranging codes. Ranging processor 634 can compare properties of the origin ranging codes to properties of the echoed versions of the ranging codes to determine a range between communication nodes. In some examples, to determine the indication of the range, ranging processor 634 performs a code correlation process between origin ranging codes and the retransmitted version of the ranging codes. This process might include separating the retransmitted version of the ranging codes from additional data communications and performing a comparison between properties of the ranging codes and the properties of the retransmitted version of the ranging codes to determine the indication of the range. This process might include subtracting a turnaround delay associated with retransmission of the retransmitted version of the ranging codes by the distant communication node when determining the indication of the range. Once a range is determined, ranging result interface 632 provides an indication of the range over a communication interface for use by external lasercom control elements. Alternatively, result interface 632 can provide an indication of the range to lasercom control system 640.

Lasercom control system 640 handles optics control, aiming control, and control of other elements of the optical pathway of a lasercom node. Optics control interface 641 can provide control instructions to alter configurations of optics or mirrors that affect a lasercom link, such as controlling deformable mirrors or optics, tilt/tip mirrors, or other optics Aiming mechanism control interface 642 can interface with and control mechanisms associated with a lasercom link, if employed. These mechanisms can include gimbals, servos, movable mounts, and other mechanisms. Lasercom control system 643 can receive as input various inertial status, optic status, orientation status, alignment status, or other information related to the pointing, orientation, or alignment of optical elements or mechanisms of a lasercom node. Lasercom control system 643 can process this information along with the range or indications of the range provided by ranging system 630 to determine adjustments or commands to control the optics or mechanisms associated with a lasercom link. In some examples, bulk movement of a device comprising a lasercom node might be required, such as when employed in a satellite device. Lasercom control system 643 might inform logistical control element of the vehicle to perform bulk movements, such as firing of thrusters, deploying mass shifting techniques, engaging flywheel or gyroscopic elements, momentum wheels, or other similar elements.

Communication interface system 607 may include communication connections and devices that allow for communication with other computing systems, control interfaces, or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 607 can receive link/quality metrics, and provide link/quality alerts to users or other operators.

Communication interface system 607 may include portions of ranging interface system 609. Ranging interface system 609 comprises various hardware and software elements for interfacing with signal links and RF modulation circuitry, transceiver equipment, or other links which carry ranging tones and associated ranging codes. Analog-to-digital conversion equipment, filtering circuitry, data processing elements, or other equipment can be included in ranging interface system 609.

Communication between control system 601 and other elements or systems, such as optics/aiming equipment (not shown), may occur over communication links or communication networks and in accordance with various communication protocols, combinations of protocols, or variations thereof. For example, control system 601 when implementing a control device, might communicate with optics/aiming equipment over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, examples networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv6, etc . . . ), the transmission control protocol (TCP), and the user datagram protocol (UDP), as well as any other suitable communication protocol, variation, or combination thereof.

User interface system 608 may be optionally included, and comprise a software or virtual interface such as a terminal interface, command line interface, or application programming interface (API). User interface system 608 may also include physical user interfaces, such as keyboard, a mouse, a voice input device, or a touchscreen input device for receiving input from a user during assembly, manufacturing, or testing operations. Output devices such as a display interfaces, audio interfaces, web interfaces, terminal interfaces, and other types of output devices may also be included in user interface system 608. User interface system 608 can provide output and receive input over a network interface, such as communication interface system 607. In network examples, user interface system 608 might packetize data for receipt by a display system or computing system coupled over one or more network interfaces. User interface system 608 may comprise API elements for interfacing with users, other data systems, other user devices, web interfaces, and the like. User interface system 608 may also include associated user interface software executable by processing system 602 in support of the various user input and output discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
combining a ranging signal with data communications into an optical transmission for receipt by a communication node;
obtaining an additional optical transmission transferred by the communication node and comprising additional data communications combined with a retransmitted version of the ranging signal; and
determining an indication of a range to the communication node based at least on a comparison between properties of the ranging signal and properties of the retransmitted version of the ranging signal after separation from the additional data communications.

2. The method of claim 1, comprising:
determining altered transmission parameters for subsequent data communications with the communication node based at least in part on the range.

3. The method of claim 1, comprising:
converting the ranging signal in a radio frequency (RF) format into an optical format and combining the ranging signal in the optical format with the data communications into the optical transmission.

4. The method of claim 1, comprising:
subtracting a turnaround delay associated with retransmission of the retransmitted version of the ranging signal by the communication node when determining the indication of the range, wherein the communication node combines the additional data communications and the ranging signal to form the additional optical transmission.

5. The method of claim 1, wherein the communication node combines the ranging signal as received in the communication node along with the additional data communications to form the additional optical transmission.

6. The method of claim 1, wherein the ranging signal in the optical transmission comprises an optical carrier frequency higher than the data communications.

7. The method of claim 1, comprising:
converting the data communications into a first optical format having a first data bandwidth;
converting the ranging signal in an RF format into a second optical format; and
combining the data communications in the first optical format with the ranging signal in the second optical format to form the optical transmission.

8. The method of claim 1, comprising:
combining the ranging signal in a first RF format with the data communications in a second RF format to form an intermediary RF signal; and
converting the intermediary RF signal into the optical transmission.

9. The method of claim 1, further comprising:
performing the comparison using at least a code correlation process between a pseudorandom noise (PN) code comprising the ranging signal and a PN code comprising the retransmitted version of the ranging signal, wherein the PN code of the retransmitted version of the ranging signal comprises the PN code of the ranging signal after retransmission by the communication node.

10. An apparatus, comprising:
a transmitter configured to establish an optical transmission comprising data communications combined with a ranging signal;
a signal processing system configured to obtain an additional optical transmission transferred by a communication node and comprising additional data communications combined with a retransmitted version of the ranging signal;
the signal processing system configured to determine an indication of a range to the communication node based at least on a comparison between properties of the ranging signal and properties of the retransmitted version of the ranging signal after separation from the additional data communications.

11. The apparatus of claim 10, comprising:
the signal processing system configured to determine altered transmission parameters for subsequent data communications with the communication node based at least in part on the range.

12. The apparatus of claim 10, comprising:
the transmitter configured to convert the ranging signal in a radio frequency (RF) format into an optical format and combining the ranging signal in the optical format with the data communications into the optical transmission.

13. The apparatus of claim 10, comprising:
the signal processing system configured to subtract a turnaround delay associated with retransmission of the retransmitted version of the ranging signal by the communication node when determining the indication of the range, wherein the communication node combines the additional data communications and the ranging signal to form the additional optical transmission.

14. The apparatus of claim 10, comprising:
an optical modulator configured to receive the ranging signal in a radio frequency (RF) format and convert into an optical format;
the transmitter configured to combine the ranging signal in the optical format with an optical format of the data communications to form the optical transmission, wherein the ranging signal in the optical format comprises a subcarrier of the optical transmission.

15. The apparatus of claim 10, comprising:
a radio frequency (RF) mixer configured to combine the ranging signal in a first RF format with the data communications in a second RF format into an intermediary RF signal; and
the transmitter configured to convert the intermediary RF signal into the optical transmission.

16. The apparatus of claim 10, comprising:
the signal processing system configured to perform the comparison by at least performing a code correlation process between a pseudorandom noise (PN) code comprising the ranging signal and a PN code comprising the retransmitted version of the ranging signal, wherein the PN code of the retransmitted version of the ranging signal comprises the PN code of the ranging signal after retransmission by the communication node.

17. A system, comprising:
a communication node configured to establish a first optical transmission comprising first data communications combined with a ranging signal;
the communication node configured to receive a second optical transmission transferred by a distant communication node and comprising second data communications combined with a retransmitted version of the ranging signal;
the communication node configured to separate the retransmitted version of the ranging signal from the second data communications, and determine a range to the distant communication node based at least on a comparison between properties of the ranging signal and properties of the retransmitted version of the ranging signal.

18. The system of claim 17, comprising:
the communication node configured to perform the comparison by at least performing a code correlation process between a pseudorandom noise (PN) code comprising the ranging signal and a PN code comprising the retransmitted version of the ranging signal.

19. The system of claim 17, comprising:
the communication node configured to convert the ranging signal in a radio frequency (RF) format into the ranging signal in an optical format for the first optical transmission;
the communication node configured to convert a portion of the second optical transmission into the RF format to obtain the retransmitted version of the ranging signal; and
the communication node configured to perform the comparison between the ranging signal in the RF format and the retransmitted version of the ranging signal in the RF format.

20. The system of claim 17, comprising:
the communication node configured to determine altered transmission parameters for subsequent data communications with the distant communication node based at least in part on the range.

* * * * *